US009932459B2

(12) United States Patent
Kotaka et al.

(10) Patent No.: US 9,932,459 B2
(45) Date of Patent: Apr. 3, 2018

(54) RESIN COMPOSITION FOR SLIDING MEMBER

(71) Applicant: Sumitomo Chemical Company, Limited, Tokyo (JP)

(72) Inventors: Hidehiro Kotaka, Tsukuba (JP); Hirokazu Matsui, Tokyo (JP); Mitsuo Maeda, Tokyo (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 15/024,662

(22) PCT Filed: Sep. 29, 2014

(86) PCT No.: PCT/JP2014/076639
§ 371 (c)(1),
(2) Date: Mar. 24, 2016

(87) PCT Pub. No.: WO2015/046630
PCT Pub. Date: Apr. 2, 2015

(65) Prior Publication Data
US 2016/0244588 A1    Aug. 25, 2016

(30) Foreign Application Priority Data

Sep. 30, 2013 (JP) ................................. 2013-203299

(51) Int. Cl.
| | | |
|---|---|---|
| *C08K 3/04* | (2006.01) | |
| *C08K 7/06* | (2006.01) | |
| *C10M 125/02* | (2006.01) | |
| *C08L 101/00* | (2006.01) | |
| *C08J 7/04* | (2006.01) | |
| *C08L 81/06* | (2006.01) | |
| *C09K 19/38* | (2006.01) | |
| *C08K 3/34* | (2006.01) | |

(52) U.S. Cl.
CPC .................. *C08K 3/04* (2013.01); *C08J 7/042* (2013.01); *C08K 3/34* (2013.01); *C08K 7/06* (2013.01); *C08L 81/06* (2013.01); *C08L 101/00* (2013.01); *C09K 19/3809* (2013.01); *C08J 2381/06* (2013.01); *C08L 2205/16* (2013.01); *C10M 2209/103* (2013.01)

(58) Field of Classification Search
CPC .... C08K 3/04; C08K 3/34; C08K 7/06; C08L 81/06; C08L 101/00; C08L 2205/16; C08J 7/042; C08J 2381/06; C10M 2209/103; C09K 19/3809

USPC ........................................................ 508/109
See application file for complete search history.

(56) References Cited

U.S. PATENT DOCUMENTS

| | | | | |
|---|---|---|---|---|
| 2005/0249964 | A1* | 11/2005 | Nakajima | ............... B32B 15/08 428/553 |
| 2012/0252955 | A1* | 10/2012 | Sekimura | ............ B29C 45/0013 524/494 |
| 2014/0226927 | A1* | 8/2014 | Ishii | ........................ F16C 13/02 384/291 |

FOREIGN PATENT DOCUMENTS

| | | | |
|---|---|---|---|
| CN | 103172994 A | 6/2013 | |
| JP | H08048887 A | 2/1996 | |
| JP | 09286915 A * | 11/1997 | |
| JP | H09286915 A | 11/1997 | |
| JP | 10182872 A * | 7/1998 | |
| JP | H10182872 A | 7/1998 | |
| JP | 2006249187 A | 9/2006 | |
| JP | 2007100023 A * | 4/2007 | |
| JP | 2007192242 A | 8/2007 | |
| JP | 2008038062 A | 2/2008 | |
| JP | 2011132550 A | 7/2011 | |
| WO | WO 2013042715 A1 * | 3/2013 | ............... F16C 13/02 |
| WO | WO 2013092307 A1 * | 6/2013 | ............... F16H 7/18 |

OTHER PUBLICATIONS

Int'l Preliminary Report on Patentability dated Apr. 14, 2016 in Int'l Application No. PCT/JP2014/076639.
Extended Search Report dated May 30, 2017 in EP Application No. 14849726.6.
Office Action dated Feb. 21, 2017 in CN Application No. 201480053064.6.
Office Action dated Aug. 22, 2017 in JP Application No. 2013-2032990.
Office Action dated Oct. 17, 2017 in TW Application No. 106210456000.
Office Action dated Dec. 5, 2017 in CN Application No. 201480053064.6.
Office Action dated Dec. 12, 2017 in JP Application No. 2013203299.

* cited by examiner

*Primary Examiner* — James Goloboy
(74) *Attorney, Agent, or Firm* — Panitch Schwarze Belisario & Nadel LLP

(57) ABSTRACT

A resin composition is provided for a sliding member. The composition contains an amorphous resin, flake graphite, and a carbon fiber. The content of the flake graphite is 5 to 40 parts by mass relative to 100 parts by mass of the amorphous resin, and the content of the carbon fiber is 5 to 60 parts by mass relative to 100 parts by mass of the amorphous resin.

6 Claims, No Drawings

RESIN COMPOSITION FOR SLIDING MEMBER

CROSS-REFERENCE TO RELATED APPLICATION

This application is a Section 371 of International Application No. PCT/JP2014/076639, filed Sep. 29, 2014, which was published in the Japanese language on Apr. 2, 2015, under International Publication No. WO 2015/046630 A1, and the disclosure of which is incorporated herein by reference.

TECHNICAL FIELD

The present invention relates to a resin composition for a sliding member.

BACKGROUND ART

As materials for sliding members, resin compositions containing an amorphous resin and flake graphite have been examined. Such a resin composition has a low mold shrinkage and thus has excellent dimensional accuracy, and it also has a low friction coefficient and thus has excellent slidability. With respect to such a resin composition, JP-A-10-182872 describes a resin composition for a sliding member, which contains, relative to 100 parts by mass of an amorphous resin having a glass transition temperature of 140° C. or more, 0 to 150 parts by weight of a crystalline resin having a melting point of 200° C. or more and 5 to 100 parts by mass of flake graphite having an average particle size of 5 to 100 μm.

DISCLOSURE OF THE INVENTION

An object of the invention is to provide a resin composition for a sliding member, which has excellent abrasion resistance, has a lower mold shrinkage, and is unlikely to damage the sliding partner.

This application relates to the following invention,

[1] A resin composition for a sliding member, comprising an amorphous resin, flake graphite, and a carbon fiber, wherein
a content of the flake graphite is 5 to 40 parts by mass relative to 100 parts by mass of the amorphous resin, and
a content of the carbon fiber is 5 to 60 parts by mass relative to 100 parts by mass of the amorphous resin.

[2] The resin composition for a sliding member according to [1], wherein the amorphous resin is at least one kind of amorphous resin selected from the group consisting of polysulfone, polycarbonate, polyimide, polyarylate, and polyarylene ether.

[3] The resin composition for a sliding member according to [1] or [2], further comprising a liquid crystal polyester.

[4] The resin composition for a sliding member according to [3], wherein a content of the liquid crystal polyester is 1 to 100 parts by mass relative to 100 parts by mass of the amorphous resin.

[5] The resin composition for a sliding member according to any one of [1] to [4], further comprising a platy filler other than flake graphite.

[6] The resin composition for a sliding member according to [5], wherein a content of the platy filler is 1 to 100 parts by mass relative to 100 parts by mass of the amorphous resin.

[7] The resin composition for a sliding member according to [5] or [6], wherein the platy filler is at least one kind of platy filler selected from the group consisting of talc and mica.

[8] A sliding member obtained by molding the resin composition for a sliding member according to any one of [1] to [7].

MODE FOR CARRYING OUT THE INVENTION

The resin composition for a sliding member of the present invention (hereinafter, this resin composition for a sliding member will be sometimes referred to as "resin composition") contains an amorphous resin, flake graphite, and a carbon fiber.

Examples of amorphous resins include polysulfone, polycarbonate, polyimide, polyarylate, and polyarylene ether, and it is also possible to use two or more kinds thereof. Among them, polysulfone is preferable.

In terms of improving the heat resistance, it is preferable that the amorphous resin has a glass transition temperature of 140° C. or more. This glass transition temperature is a midpoint glass transition temperature determined by differential scanning calorimetry (DSC) in accordance with JIS K7121:1987.

Typically, a polysulfone is a resin having a repeating unit including a divalent aromatic group (a residue of an aromatic compound, resulting from the removal of two hydrogen atoms attached to the aromatic ring), a sulfonyl group ($-SO_2-$), and an oxygen atom.

In terms of improving the heat resistance or improving the chemical resistance, the polysulfone preferably has a repeating unit represented by the following formula (1) (hereinafter sometimes referred to as "repeating unit (1)"), and may further have one or more other repeating units, such as a repeating unit represented by the following formula (2) (hereinafter sometimes referred to as "repeating unit (2)") and a repeating unit represented by the following formula (3) (hereinafter sometimes referred to as "repeating unit (3)").

$$-Ph^1-SO_2-Ph^2-O- \quad (1)$$

($Ph^1$ and $Ph^2$ each independently represent a phenylene group. The hydrogen atoms in the phenylene group are each independently optionally substituted with an alkyl group, an aryl group, or a halogen atom.)

$$-Ph^3-R-Ph^4-O- \quad (2)$$

($Ph^3$ and $Ph^4$ each independently represent a phenylene group. The hydrogen atoms in the phenylene group are each independently optionally substituted with an alkyl group, an aryl group, or a halogen atom. R represents an alkylidene group, an oxygen atom, or a sulfur atom.)

$$-(Ph^5)_n-O- \quad (3)$$

($Ph^5$ represents a phenylene group. The hydrogen atoms in the phenylene group are each independently optionally substituted with an alkyl group, an aryl group, or a halogen atom, n represents an integer of 1 to 3. In the case where n is 2 or more, the $Ph^5$s may be the same or different from each other.)

The phenylene group represented by any one of $Ph^1$ to $Ph^5$ may be a p-phenylene group, an m-phenylene group, or an o-phenylene group, but is preferably a p-phenylene group.

Examples of alkyl groups that the phenylene group may have include $C_{1-10}$ alkyl groups such as a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group.

Examples of aryl groups that the phenylene group may have include $C_{6-20}$ aryl groups such as a phenyl group, an o-tolyl group, an m-tolyl group, a p-tolyl group, a 1-naphthyl group, and a 2-naphthyl group. In the case where the phenylene group is substituted, the number of substituents is usually 2 or less, and preferably 1 or less.

Examples of alkylidene groups represented by R include $C_{1-5}$ alkylidene groups such as a methylene group, an ethylidene group, an isopropylidene group, and a 1-butylidene group.

The polysulfone preferably has the repeating unit (1) in an amount of 50 mol % or more, more preferably 80 mol % or more, of the total repeating units, and still more preferably has substantially only the repeating unit (1) as a repeating unit.

The polysulfone may have two or more kinds of each of the repeating units (1) to (3).

A polysulfone can be produced by the polycondensation of a dihalogeno sulfone compounds and a dihydroxy compound corresponding to the repeating unit.

A resin having the repeating unit (1) can be produced using a compound represented by the following formula (4) (hereinafter sometimes referred to as "compound (4)") as a dihalogeno sulfone compound and a compound represented by the following formula (5) (hereinafter sometimes referred to as "compound (5)") as a dihydroxy compound.

A resin having the repeating unit (1) and the repeating unit (2) can be produced using a compound (4) as a dihalogeno sulfone compound and a compound represented by the following formula (6) (hereinafter sometimes referred to as "compound (6)") as a dihydroxy compound. A resin having the repeating unit (1) and the repeating unit (3) can be produced using a compound (4) as a dihalogeno sulfone compound and a compound represented by the following formula (7) (hereinafter sometimes referred to as "compound (7)") as a dihydroxy compound.

$$X^1\text{-}Ph^1\text{-}SO_2\text{-}Ph^2\text{-}X^2 \qquad (4)$$

($X^1$ and $X^2$ each independently represent a halogen atom. $Ph^1$ and $Ph^2$ are as defined above.)

$$HO\text{-}Ph^1\text{-}SO_2\text{-}Ph^2\text{-}OH \qquad (5)$$

($Ph^1$ and $Ph^2$ are as defined above.)

$$HO\text{-}Ph^3\text{-}R\text{-}Ph^4\text{-}OH \qquad (6)$$

($Ph^3$, $Ph^4$, and R are as defined above.)

$$HO\text{-}(Ph^5)_n\text{-}OH \qquad (7)$$

($Ph^5$ and n are as defined above.)

It is preferable the polycondensation is performed using an alkali metal carbonate in a solvent.

The alkali metal carbonate may be an alkali carbonate which is a normal salt, an alkali bicarbonate (alkali hydrogen carbonate) which is an acid salt, or a mixture of the two. Preferred examples of alkali carbonates include sodium, carbonate and potassium carbonate. Preferred examples of alkali bicarbonates include sodium bicarbonate and potassium bicarbonate.

Preferred examples of solvents include organic polar solvents such as dimethyl sulfoxide, 1-methyl-2-pyrrolidone, sulfolane (1,1-dioxothilan), 1,3-dimethyl-2-imidazolidinone, 1,3-diethyl-2-imidazolidinone, dimethyl sulfone, diethyl sulfone, diisopropyl sulfone, and diphenyl sulfone.

It is preferable that the polysulfone has a reduced viscosity of 0.25 to 0.60 dl/g.

Considering the mechanical strength and chemical resistance of the resulting molded body, and also for the suppression of gas generation, it is preferable that the reduced viscosity is not low. Meanwhile, in order to prevent the loss of fluidity during molding due to an increase in the melt viscosity of the polysulfone, it is preferable that the reduced viscosity is not too high.

Considering the physical properties of the molded body, such as mechanical strength, chemical resistance, and generated gas, and also the balance between the stability of the physical properties of the molded body and the workability, the reduced viscosity is more preferably 0.30 to 0.55 dl/g, and still more preferably 0.35 to 0.55 dl/g.

In the polycondensation, in the case where no side reaction occurs, when the molar ratio between the dihalogeno sulfone compound and the dihydroxy compound is closer to 1:1, when the amount of alkali metal carbonate used is larger, when the polycondensation temperature is higher, and when the polycondensation time is longer, the polymerization degree of the resulting polysulfone tends to be higher, whereby a polysulfone having a high reduced viscosity is likely to be obtained. However, in reality, in the polycondensation, due to the by-produced alkali hydroxide, etc., side reactions occur, including the substitution of a hydroxyl group into a halogeno group, depolymerization, etc.; as a result, the polymerization degree of the resulting polysulfone tends to decrease, whereby a polysulfone having a low reduced viscosity is likely to be obtained. It is preferable that the molar ratio between the dihalogeno sulfone compound and the dihydroxy compound, the amount of alkali metal carbonate used, the polycondensation temperature, and the polycondensation time are adjusted to obtain a polysulfone having a desired reduced viscosity also considering the degree of these side reactions.

The flake graphite may be natural flake graphite or artificial flake graphite, and it is also possible to use two or more kinds thereof.

It is preferable that the flake graphite has a high content of fixed carbon.

In the flake graphite, it is preferable that the content of ash, such as silicon oxide, is low.

It is preferable that the flake graphite has high crystallinity.

The volume average particle size of the flake graphite is usually 5 to 100 μm, preferably 5 to 80 μm, and more preferably 5 to 60 μm.

The volume average particle size of the flake graphite can be measured by a laser diffraction scattering method.

The number average aspect ratio of the flake graphite (number average plate surface diameter (area-equivalent circle diameter)/number average plate thickness) is usually 5 to 200, and preferably 10 to 100. The number average plate surface diameter and number average plate thickness of the flake graphite can be measured by electron microscopic observation.

The content of the flake graphite in the resin composition is 5 to 40 parts by mass, preferably 10 to 30 parts by mass, relative to 100 parts by mass of the amorphous resin.

The higher the content of the flake graphite, the more likely that the slidability of the resin composition improves and the mold shrinkage of the resin composition decreases. However, when the content is too high, the abrasion resistance of the resin composition is likely to decrease.

The carbon fiber may be a PAN-based carbon fiber made from polyacrylonitrile, a pitch-based carbon fiber made from coal tar or petroleum pitch, a cellulose-based carbon fiber made from viscose rayon, cellulose acetate, or the like, or a vapor-grown carbon fiber made from hydrocarbon or the like, and it is also possible to use two or more kinds thereof. The carbon fiber may be a chopped carbon fiber or a milled carbon fiber, and it is also possible to use two or more kinds thereof.

The number average fiber diameter of the carbon fiber is usually 5 to 20 μm, and preferably 5 to 15 μm. The number average aspect ratio of the carbon fiber (number average fiber length/number average fiber diameter) is usually 10 to 200, and preferably 20 to 100.

The number average fiber diameter and number average fiber length of the carbon fiber can be measured by electron microscopic observation. Incidentally, carbon fibers are usually broken when blended into an amorphous resin by melt-kneading or the like. Thus, it is possible to use, for example, a long carbon fiber having a number average aspect ratio of 500 or more as a raw material, and breaking the fiber during blending, thereby making the aspect ratio within the above range.

The content of the carbon fiber in the resin composition is 5 to 60 parts by mass, preferably 15 to 60 parts by mass, relative to 100 parts by mass of the amorphous resin. The higher the content of the carbon fiber, the more likely that the abrasion resistance of the resin composition improves. However, when the content is too high, the sliding partner is likely to be damaged.

In terms of improving the melt fluidity, it is preferable that the resin composition further contains a liquid crystal polyester.

It is preferable that the liquid crystal polyester is a liquid crystal polyester that shows liquid crystallinity in a molten state and melts at a temperature of 450° C. or less.

The liquid crystal polyester may be a liquid crystal polyester amide, a liquid crystal polyester ether, a liquid crystal polyester carbonate, or a liquid crystal polyester imide. It is preferable that the liquid crystal polyester is a wholly aromatic liquid crystal polyester obtained using only an aromatic compound as a raw material monomer.

Typical examples of liquid crystal polyesters include:
a polyester obtained by the polymerization (polycondensation) of an aromatic hydroxycarboxylic acid, an aromatic dicarboxylic acid, and at least one kind of compound selected from the group consisting of aromatic diols, aromatic hydroxylamines, and aromatic diamines;
a polyester obtained by the polymerization of several kinds of aromatic hydroxycarboxylic acids;
a polyester obtained by the polymerization of an aromatic dicarboxylic acid and at least one kind of compound selected from the group consisting of aromatic diols, aromatic hydroxylamines, and aromatic diamines; and
a polyester obtained by the polymerization of a polyester, such as polyethylene terephthalate, and an aromatic hydroxycarboxylic acid.

Here, with respect to aromatic hydroxycarboxylic acids, aromatic dicarboxylic acids, aromatic diols, aromatic hydroxylamines, and aromatic diamines, each may be partially or totally replaced with a polymerizable derivative thereof (hereinafter, this derivative is referred to as "derivative").

Examples of derivatives of compounds having a carboxyl group, such as an aromatic hydroxycarboxylic acid or an aromatic dicarboxylic acid, include a compound having the carboxyl group converted into an alkoxycarbonyl group or an aryloxycarbonyl group (ester), a compound having the carboxyl group converted into a haloformyl group (acid halide), and a compound having the carboxyl group converted into an acyloxycarbonyl group (acid anhydride).

Examples of derivatives of compounds having a hydroxyl group, such as an aromatic hydroxycarboxylic acid, an aromatic diol, and an aromatic hydroxylamine, include a compound having the hydroxyl group acylated into an acyloxyl group (acylated product).

Examples of derivatives of compounds having an amino group, such as an aromatic hydroxylamine and an aromatic diamine, include a compound having the amino group acylated into an acylamino group (acylated product).

The liquid crystal polyester preferably has a repeating unit represented by the following formula (A) (hereinafter sometimes referred to as "repeating unit (A)"), and more preferably has a repeating unit (A), a repeating unit represented by the following formula (B) (hereinafter sometimes referred to as "repeating unit (B)"), and a repeating unit represented by the following formula (C) (hereinafter sometimes referred to as "repeating unit (C)").

—O—Ar$^1$—CO— (A)

—CO—Ar$^2$—CO— (B)

—X—Ar$^3$—Y— (C)

(Ar$^1$ represents a phenylene group, a naphthylene group, or a biphenylylene group. Ar$^2$ and Ar$^3$ each independently represent a phenylene group, a naphthylene group, a biphenylylene group, or a group represented by the following formula (D). X and Y each independently represent an oxygen atom or an imino group (—NH—). The hydrogen atoms in each group represented by Ar$^1$, Ar$^2$, or Ar$^3$ are each independently optionally substituted with a halogen atom, an alkyl group, or an aryl group.)

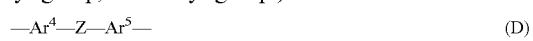

—Ar$^4$—Z—Ar$^5$— (D)

(Ar$^4$ and Ar$^5$ each independently represent a phenylene group or a naphthylene group. The hydrogen atoms in each group represented by Ar$^4$ or Ar$^5$ are each independently optionally substituted with a halogen atom, an alkyl group, or an aryl group. Z represents an oxygen atom, a sulfur atom, a carbonyl group, a sulfonyl group, or an alkylidene group.)

Examples of halogen atoms include a fluorine atom, a chlorine atom, a bromine atom, and an iodine atom.

Examples of alkyl groups include $C_{1-10}$ alkyl groups such as a methyl group, an ethyl group, an n-propyl group, an isopropyl group, an n-butyl group, an isobutyl group, an s-butyl group, a t-butyl group, an n-hexyl group, a 2-ethylhexyl group, an n-octyl group, and an n-decyl group.

Examples of aryl groups include $C_{6-20}$ aryl groups such as a phenyl group, an o-tolyl group, an m-tolyl group, a p-tolyl group, a 1-naphthyl group, and a 2-naphthyl group.

The number of substituents that Ar$^1$, Ar$^2$, and Ar$^3$ each independently have is usually 2 or less, and preferably 1 or less.

It is preferable that Ar$^4$ and Ar$^5$ are each independently a phenylene group or a naphthylene group.

Examples of alkylidene groups include $C_{1-10}$ alkylidene groups such as a methylene group, an ethylidene group, an isopropylidene group, an n-butylidene group, and a 2-ethylhexylidene group.

The repeating unit (A) is a repeating unit derived from a predetermined aromatic hydroxycarboxylic acid. Preferred examples of repeating units (A) include a repeating unit wherein Ar$^1$ is a p-phenylene group (repeating unit derived from p-hydroxybenzoic acid) and a repeating unit wherein Ar$^1$ is a 2,6-naphthylene group (repeating unit derived from 6-hydroxy-2-naphthoic acid).

The repeating unit (B) is a repeating unit derived from a predetermined aromatic dicarboxylic acid. Preferred examples of repeating units (B) include a repeating unit wherein $Ar^2$ is a p-phenylene group (repeating unit derived from terephthalic acid), a repeating unit wherein $Ar^2$ is an m-phenylene group (repeating unit derived from isophthalic acid), a repeating unit wherein $Ar^2$ is a 2,6-naphthylene group (repeating unit derived from 2,6-naphthalenedicarboxylic acid), and a repeating unit wherein $Ar^2$ is a diphenyl ether-4,4'-diyl group (repeating unit derived from diphenyl ether-4,4'-dicarboxylic acid).

The repeating unit (C) is a repeating unit derived from a predetermined aromatic diol, aromatic hydroxylamine, or aromatic diamine.

Preferred examples of repeating units (C) include a repeating unit wherein $Ar^3$ is a p-phenylene group (repeating unit derived from hydroquinone, p-aminophenol, or p-phenylenediamine) and a repeating unit wherein $Ar^3$ is a 4,4'-biphenylylene group (repeating unit derived from 4,4'-dihydroxybiphenyl, 4-amino-4'-hydroxybiphenyl, or 4,4'-diaminobiphenyl).

The content of the repeating unit (A) is usually 30 mol % or more, preferably 30 to 80 mol %, more preferably 40 to 70 mol %, and still more preferably 45 to 65 mol %, of the total repeating units.

The content of the repeating unit (B) is usually 35 mol % or less, preferably 10 to 35 mol %, more preferably 15 to 30 mol %, and still more preferably 17.5 to 27.5 mol %, of the total repeating units.

The content of the repeating unit (C) is usually 35 mol % or less, preferably 10 to 35 mol %, more preferably 15 to 30 mol %, and still more preferably 17.5 to 27.5 mol %, of the total repeating units.

The wording "total repeating units" means a value calculated by dividing the mass of each repeating unit forming the liquid crystal polyester by the formula weight of the repeating unit to determine the molar-equivalent amount of each repeating unit (mol), and summing the results.

The higher the content of the repeating unit (A), the more likely that the melt fluidity, heat resistance, and strength/rigidity improve. In order to prevent the melting temperature, the melt viscosity, or the temperature required for molding from being too high, it is preferable that the content is within the above range.

The ratio between the content of the repeating unit (B) and the content of the repeating unit (C) is, as [the content of the repeating unit (B)]/[the content of the repeating unit (C)] (mol/mol), usually 0.9/1 to 1/0.9, preferably 0.95/1 to 1/0.95, and more preferably 0.98/1 to 1/0.98.

The liquid crystal polyester may have two or more kinds of each of the repeating units (A) to (C). The liquid crystal polyester may also have repeating units other than the repeating units (A) to (C), but the content thereof is usually 10 mol % or less, preferably 5 mol % or less, of the total repeating units.

It is preferable that the liquid crystal polyester has, as a repeating unit (C), a repeating unit wherein X and Y are each an oxygen atom, that is, a repeating unit derived from a predetermined aromatic diol; this is because the resulting melt viscosity is likely to be low. It is more preferable that the liquid crystal polyester has, as a repeating unit (C), only a repeating unit wherein X and Y are each an oxygen atom.

It is preferable that the liquid crystal polyester is produced by melt-polymerizing the raw material monomer corresponding to the repeating unit, and then solid-state polymerizing the resulting polymer (hereinafter sometimes referred to as "prepolymer"). As a result, a high-molecular-weight liquid crystal polyester having high heat resistance and high strength/rigidity can be produced with sufficient operability. Melt polymerization may be performed in the presence of a catalyst. Examples of such catalysts include metal compounds, such as magnesium acetate, tin (I) acetate, tetrabutyl titanate, lead acetate, sodium acetate, potassium acetate, and antimony trioxide, and nitrogen-containing heterocyclic compounds, such as 4-(dimethylamino)pyridine and 1-methylimidazole, and it is preferable to use a nitrogen-containing heterocyclic compound.

The flow beginning temperature of the liquid crystal polyester is usually 270° C. or more, preferably 270 to 400° C., and more preferably 280 to 380° C. The higher the flow beginning temperature, the more likely that the heat resistance and strength/rigidity improve. In order to prevent the melting temperature, the melt viscosity, or the temperature required for molding from being too high, it is preferable that the flow beginning temperature is within the above range.

Flow beginning temperature is also called flow temperature, and refers to a temperature at which a viscosity of 4800 Pa·s (48000 poise) is shown under the following conditions: using a capillary rheometer, a liquid crystal polyester is melted under a load of 9.8 MPa (100 kg/cm$^2$) while raising a temperature at a rate of 4° C./min and extruded through a nozzle having an inner diameter of 1 mm and a length of 10 mm, which serves as an index of the molecular weight of the liquid crystal polyester (see Naoyuki KOIDE ed., "*Ekisho Porima—Gosei, Seikei, Oyou—* (Liquid Crystal Polymer—Synthesis, Molding, Application—", CMC, Jun. 5, 1987, p. 95).

The content of the liquid crystal polyester in the resin composition is usually 1 to 100 parts by mass, preferably 5 to 50 parts by mass, relative to 100 parts by mass of the amorphous resin.

The higher the content of the liquid crystal polyester, the more likely that the melt fluidity of the resin composition improves. Meanwhile, in order to reduce both the mold shrinkage of the resin composition in MD (Machine Direction: the flow direction during molding) and the mold shrinkage of the resin composition in the TD direction (Transverse Direction: the direction perpendicular to the flow direction during molding), it is preferable that the content is within the above range.

In terms of further improving the slidability and reducing the mold shrinkage, it is preferable that the resin composition further contains a platy filler other than flake graphite.

It is preferable that the platy filler is a platy inorganic filler. Preferred examples thereof include mica and talc, and it is also possible to use two or more kinds thereof.

The volume average particle size of the platy filler is usually 5 to 100 μm, preferably 5 to 80 μm, and more preferably 5 to 60 μm.

The volume average particle size of the platy filler can be measured by a laser diffraction scattering method.

The number average aspect ratio of the platy filler (number average plate surface diameter (area-equivalent circle diameter)/number average plate thickness) is usually 5 to 200, and preferably 10 to 100.

The number average plate surface diameter and number average plate thickness of the platy filler can be measured by electron microscopic observation.

The content of the platy filler in the resin composition is usually 1 to 100 parts by mass, preferably 5 to 50 parts by mass, relative to 100 parts by mass of the amorphous resin.

The higher the content of the platy filler, the more likely that the slidability of the resin composition improves and the mold shrinkage of the resin composition decreases. In order to avoid a decrease in the abrasion resistance of the resulting resin composition, it is preferable that the content is within the above range.

The resin composition may also contain other components as necessary, including, for example, resins other than amorphous resins and liquid crystal polyesters, fillers other than carbon fibers and platy fillers, and additives such as antioxidants, heat stabilizers, UV absorbers, antistatic agents, surfactants, flame retarders, and colorants. However, the content thereof, as the total content in the case where a plurality of components are contained, is usually 10 parts by mass or less relative to 100 parts by mass of the amorphous resin.

It is preferable that the resin composition is prepared by melt-kneading an amorphous resin, flake graphite, and a carbon fiber, together with other components used as necessary, using an extruder, followed by extrusion into strands and pelletizing.

As the extruder, it is preferable to use an extruder that includes a cylinder, at least one screw provided in the cylinder, and at least one supply port provided to the cylinder, and it is more preferable to use an extruder that further includes at least one vent portion provided to the cylinder.

The resin composition for a sliding member of the present invention has excellent abrasion resistance, has a low mold shrinkage, and is unlikely to damage the sliding partner, and thus is used as a material of a sliding member.

A sliding member obtained by molding the resin composition for a sliding member is also within the scope of the invention of the present application.

Examples of applications of the sliding member include a window frame of an optical reader, a magnetic head support of a magnetic disk drive, a bearing, a slider, a gear, a cam, and a seal ring.

The sliding member may be in the shape of a circular column, a circular cylinder, a rectangular column, or a rectangular cylinder, for example.

EXAMPLES

Production Example 1 (Production of Liquid Crystal Polyester)

In a reactor equipped with a stirring device, a torque meter, a nitrogen gas introducing pipe, a thermometer, and a reflux condenser, 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, 1347.6 g (13.2 mol) of acetic anhydride, and 0.2 g 1-methylimidazole were placed. The gas in the reactor was replaced with nitrogen gas, and then, in a nitrogen gas flow, with stirring, the temperature was raised from room temperature to 150° C. over 30 minutes, followed by refluxing at 150° C. for 1 hour. Next, 0.9 g of 1-methylimidazole was added. Subsequently, while distilling off the by-produced acetic acid and unreacted acetic anhydride, the temperature was raised from 150° C. to 320° C. over 2 hours and 50 minutes. At the time when an increase in torque was observed, the content was taken from the reactor and cooled to room temperature. The obtained solid matter was ground in a grinder. In a nitrogen atmosphere, the temperature was raised from room temperature to 250° C. over 1 hour, then raised from 250° C. to 285° C. over 5 hours, and maintained at 285° C. for 3 hours, thereby causing solid-state polymerization, followed by cooling. Thus, a powdery liquid crystal polyester was obtained. The flow beginning temperature of this liquid crystal polyester was 327° C.

Examples 1 to 12 and Comparative Examples 1 and 2

A polyethersulfone as an amorphous resin ("SUMIKA EXCEL PES 3600P" manufactured by Sumitomo Chemical Co., Ltd., glass transition temperature: 225° C.), flake graphite ("CSP" manufactured by Nippon Graphite Industries, Ltd.), a carbon fiber ("PYROFIL TCTR-03164" manufactured by Mitsubishi Rayon Co., Ltd.), the liquid crystal polyester obtained in Production Example 1, and mica ("AB25S" manufactured by Yamaguchi Mica Co., Ltd.) were mixed using a tumbler at each ratio shown in Table 1. Subsequently, using a twin-screw extruder ("PCM-30" manufactured by Ikegai Tekko Co., Ltd.), the mixture was melt-kneaded at 340° C. and then pelletized. The obtained pellets were dried at 180° C. for 12 hours using a hot-air circulation dryer, and then, using an injection molding machine ("Model PS40E-5ASE" manufactured by Nissei Plastic Industrial Co., Ltd.; die size=64 mm (MD)×64 mm (TD)×3 mm), injected at a cylinder temperature of 350° C. and a die temperature of 150° C., thereby giving a planar molded body.

The lengths (μm) of the two sides of the obtained molded body in MD were measured to determine the average, and, from this average and the length (μm) of the die cavity in MD, the shrinkage in MD was determined using the following equation. In addition, the lengths (μm) of the two sides of the obtained molded body in TD were measured to determine the average, and, from this average and the length (μm) of the die cavity in TD, the shrinkage in TD was determined using the following equation. The results are shown in Table 1.

Shrinkage in $MD$=(length of the die cavity in $MD$−average length of the two sides of the molded body in $MD$)/length of the die cavity in $MD$×100

Shrinkage in $TD$=(length of the die cavity in $TD$−average length of the two sides of the molded body in $TD$)/length of the die cavity in $TD$×100

A 10 mm×10 mm×3 mm specimen was cut from the center region of the obtained molded body. Using "HEIDON Surface Tester, TYPE 14DR" manufactured by Shinto Scientific Co., Ltd., the specimen was subjected to a friction wear test using a PPC sheet ("TANOSEE PPCPW-A4" manufactured by of Otsuka Corporation) as the friction partner under the following conditions: speed: 5 m/min, load: 100 g, moving distance: 50 mm (100 mm back and forth)×1000 back-and-forth movements. The mass loss of the specimen was measured, and, at the same time, the degree of soiling caused to the partner (the transfer of shedding product from the specimen to the partner) (high, low, none) and the degree of roughening caused to the partner (high, low, none) were also observed. The results are shown in Table 1.

TABLE 1

| Example | Poly-ethersulfone (Part by mass) | Flake graphite (Part by mass) | Carbon fiber (Part by mass) | Liquid crystal polyester (Part by mass) | Mica (Part by mass) | Mold shrinkage MD (%) | Mold shrinkage TD (%) | Friction wear test Mass loss (mg) | Friction wear test Soiling to partner | Friction wear test Roughening to partner |
|---|---|---|---|---|---|---|---|---|---|---|
| Example 1 | 100 | 6 | 12 | — | — | 0.22 | 0.40 | 0.11 | None | None |
| Example 2 | 100 | 6 | 19 | — | — | 0.16 | 0.31 | 0.10 | None | None |
| Example 3 | 100 | 7 | 27 | — | — | 0.09 | 0.21 | 0.08 | None | None |
| Example 4 | 100 | 7 | 36 | — | — | 0.04 | 0.12 | 0.06 | None | None |
| Example 5 | 100 | 13 | 20 | — | — | 0.07 | 0.35 | 0.11 | None | None |
| Example 6 | 100 | 21 | 21 | — | — | 0.07 | 0.24 | 0.15 | Low | None |
| Example 7 | 100 | 31 | 23 | — | — | 0.06 | 0.12 | 0.19 | Low | None |
| Example 8 | 100 | 14 | 21 | 7 | — | 0.05 | 0.35 | 0.13 | None | None |
| Example 9 | 100 | 15 | 23 | 15 | — | 0.04 | 0.35 | 0.13 | None | None |
| Example 10 | 100 | 15 | 23 | — | 15 | 0.07 | 0.18 | 0.13 | None | None |
| Example 11 | 100 | 17 | 25 | — | 25 | 0.06 | 0.13 | 0.13 | None | None |
| Example 12 | 100 | 18 | 27 | 9 | 27 | 0.05 | 0.13 | 0.13 | None | None |
| Comparative Example 1 | 100 | — | 11 | — | — | 0.25 | 0.42 | 0.08 | None | High |
| Comparative Example 2 | 100 | 42 | 25 | — | — | 0.06 | 0.11 | 0.30 | High | None |

INDUSTRIAL APPLICABILITY

The resin composition for a sliding member of the present invention has excellent abrasion resistance, has a low mold shrinkage, and is unlikely to damage the sliding partner.

The invention claimed is:

1. A resin composition for a sliding member, comprising an amorphous resin, flake graphite, a carbon fiber, and a liquid crystal polyester, wherein
  a content of the flake graphite is 14 to 40 parts by mass relative to 100 parts by mass of the amorphous resin,
  a content of the carbon fiber is 5 to 60 parts by mass relative to 100 parts by mass of the amorphous resin,
  a content of the liquid crystal polyester is 1 to 100 parts by mass relative to 100 parts by mass of the amorphous resin,
  the amorphous resin is at least one kind of amorphous resin selected from the group consisting of a polysulfone, a polyarylate, and a polyarylene ether, and
  wherein the liquid crystal polyester is at least one kind selected from the group consisting of a liquid crystal polyester amide, a liquid crystal polyester ether, a liquid crystal polyester carbonate, and a liquid crystal polyester imide.

2. The resin composition for a sliding member according to claim 1, further comprising a platy filler other than the flake graphite.

3. The resin composition for a sliding member according to claim 2, wherein a content of the platy filler is 1 to 100 parts by mass relative to 100 parts by mass of the amorphous resin.

4. The resin composition for a sliding member according to claim 2, wherein the platy filler is at least one kind of platy filler selected from the group consisting of talc and mica.

5. A sliding member obtained by molding the resin composition for a sliding member according to claim 1.

6. The resin composition for a sliding member according to claim 1, wherein the content of the flake graphite is 15 to 40 parts by mass relative to 100 parts by mass of the amorphous resin.

* * * * *